United States Patent [19] | [11] 4,225,847
Masuda et al. | [45] Sep. 30, 1980

[54] DISPLAY CIRCUIT

[75] Inventors: Eiji Masuda, Kawasaki; Teruaki Tanaka; Tetsuo Yamaguchi, both of Yokohama; Hiroaki Suzuki, Tokyo, all of Japan

[73] Assignee: Tokyo Shibaura Denki Kabushiki Kaisha, Japan

[21] Appl. No.: 19,248

[22] Filed: Mar. 9, 1979

[30] Foreign Application Priority Data

Mar. 16, 1978 [JP] Japan ................................ 53-30243

[51] Int. Cl.[2] ...................... G06K 15/18; G04C 17/02
[52] U.S. Cl. ...................................... 340/802; 368/87; 368/239; 340/706; 340/756
[58] Field of Search ........................ 340/802; 58/50 R

[56] References Cited

U.S. PATENT DOCUMENTS

| | | | |
|---|---|---|---|
| 3,810,356 | 5/1974 | Fujita | 58/23 R |
| 3,953,964 | 5/1976 | Suppa et al. | 58/50 R |
| 3,973,254 | 8/1976 | Nomiya et al. | 340/802 X |
| 3,986,333 | 10/1976 | Kimura et al. | 58/50 R |
| 4,005,404 | 1/1977 | Soobik | 340/802 X |
| 4,074,515 | 2/1978 | Asano | 58/50 R |
| 4,085,575 | 4/1978 | Tanaka | 58/50 R |
| 4,095,413 | 6/1978 | Reich | 58/50 R |
| 4,125,993 | 11/1978 | Emile | 340/802 X |

*Primary Examiner*—David L. Trafton
*Attorney, Agent, or Firm*—Finnegan, Henderson, Farabow, Garrett & Dunner

[57] ABSTRACT

Disclosed is a data display circuit which comprises a shift register circuit including six cascade-connected shift registers shifting serial data to produce parallel data, a decoder circuit including three decoders receiving the parallel data from the shift register circuit and producing output data corresponding to such input data, a latch circuit coupled to the decoder circuit, a control circuit coupled to the decoder circuit and the latch circuit and supplying these decoder and latch circuits with control pulses so that output data from the decoder circuit may be held temporarily in the latch circuit, and a display device for displaying output data from the latch circuit. In this data display circuit, the three decoders have input terminals coupled respectively with the output terminals of different groups of four cascade-connected shift registers of the shift register circuit, and the control circuit energizes the three decoders at different times, thereby applying substantially the same data from the shift registers to the decoders.

8 Claims, 3 Drawing Figures

DISPLAY CIRCUIT

BACKGROUND OF THE INVENTION

This invention relates to a data display circuit which may be used for a display unit of an electronic clock or watch.

In integrating a display circuit which converts display data of an electronic clock or watch into display segment data and displays the same, the integrated circuit design has had to be modified according to the variations in the number of display digits and functions as specified.

FIG. 1 shows a prior art data display circuit used with an electronic clock. The data display circuit of FIG. 1 is provided with a data source 2 composed of a timer circuit or the like which is driven by a timing pulse generator 4 to produce serial time data. The serial time data from the data source 2 are converted into parallel time data by a shift register circuit including four cascade-connected 1-bit shift registers 6 to 9, and then supplied to a decoder circuit 10. The decoder circuit 10, which includes decoders for processing, for example, decimal, duodecimal and scale-of-24 data to process output data from the shift register circuit, converts the output data from the shift register circuit into segment data by digit for each segment in accordance with segment designating signals C1 to C7 and digit designating signals D1 to DN from a control circuit 12. Output data from the decoder circuit 10 are successively supplied to N cascade-connected shift registers 14-1 to 14-N driven by digit enable signals DE which are delivered from the control circuit 12 in synchronism with the digit designating signals D1 to DN. The respective output terminals of these shift registers 14-1 to 14-N are coupled to latches 16-1 to 16-7. The latches 16-1 to 16-7 are controlled, respectively, by output signals of AND gates 18-1 to 18-7 which receive the digit designating signal DN at their respective one input terminals and the segment designating signals C1 to C7 at the other input terminals, respectively. Exclusive OR gates 20-1 to 20-7 which receive respectively the output data of the latches 16-1 to 16-7 modulate the input data into segment energizing signals in accordance with a modulation signal from the control circuit 12, and supply them to display devices 22-1 to 22-7.

In the display circuit as shown in FIG. 1, the decoder circuit 10 decodes the input data from the shift registers 6 to 9 in response to the digit designating signals D1 to DN that are produced while the segment designating signal C1 is being produced, and delivers the decoded data to the shift registers 14-1 to 14-N. When shifting of the output data from the decoder circuit 10 to the shift registers 14-1 to 14-N is completed, the data held in the shift registers 14-1 to 14-N are introduced into the latch circuit 16-1 which is energized by the digit designating signal DN produced at the ending stage of the segment designating signal C1. In consequence, the latch circuit 16-1 may hold first- to Nth-digit data for one of seven segments that are arranged "8"-shaped, for examle. Likewise, during a period when the segment designating signal C2 is produced, first- to Nth-digit data for another segment may be held in the latch circuit 16-2. Thus, first- to Nth-digit segment data for the seven segments are stored respectively in the latch circuits 16-1 to 16-7, and each of the display devices 22-1 to 22-N displays predetermined one of the seven segments, covering from first to Nth digits.

The decoder circuit 10 used with the data display circuit of FIG. 1 includes a number of decoders which are selectively caused to operate by the digit designating signals D1 to DN, the output terminals of the decoders being coupled to a common output terminal through OR circuits. Accordingly, modification of the function of the data display circuit requires substantial modification of the decoder circuit 10 and timing control circuit 12. Further, in order to store the output data of the decoder circuit 10 in the latch circuits 16-1 to 16-7, it is required that the digit designating signals D1 to DN be repeated seven times or be produced for each of the segment designating signals C1 to C7, thereby prolonging the time required.

Thus, this type of data display circuit is unfit for a case where data display need be made on a fine unit of time for stop-watch operation.

SUMMARY OF THE INVENTION

The object of this invention is to provide a data display circuit capable of simple design modification for desired functions.

According to an embodiment of this invention, there is provided a data display circuit comprising a decoding means including a plurality of decoders which receive parallel data with predetermined delay time and decode the individual input parallel data, plurality of common lines connecting in common the corresponding output terminals of the plurality of decoders, a latch means including a plurality of latches with input terminals respectively coupled to the common lines, control means for supplying the plurality of decoders with timing signals with the predetermined delay time and transferring the output data from the individual decoders to the latch means, and display means for displaying the stored contents of the latch means.

DETAILED DESCRIPTION OF THE PREFERRED EMBODIMENT

Now there will be described a data display circuit according to an embodiment of this invention with reference to the accompanying drawings.

Figure 1:
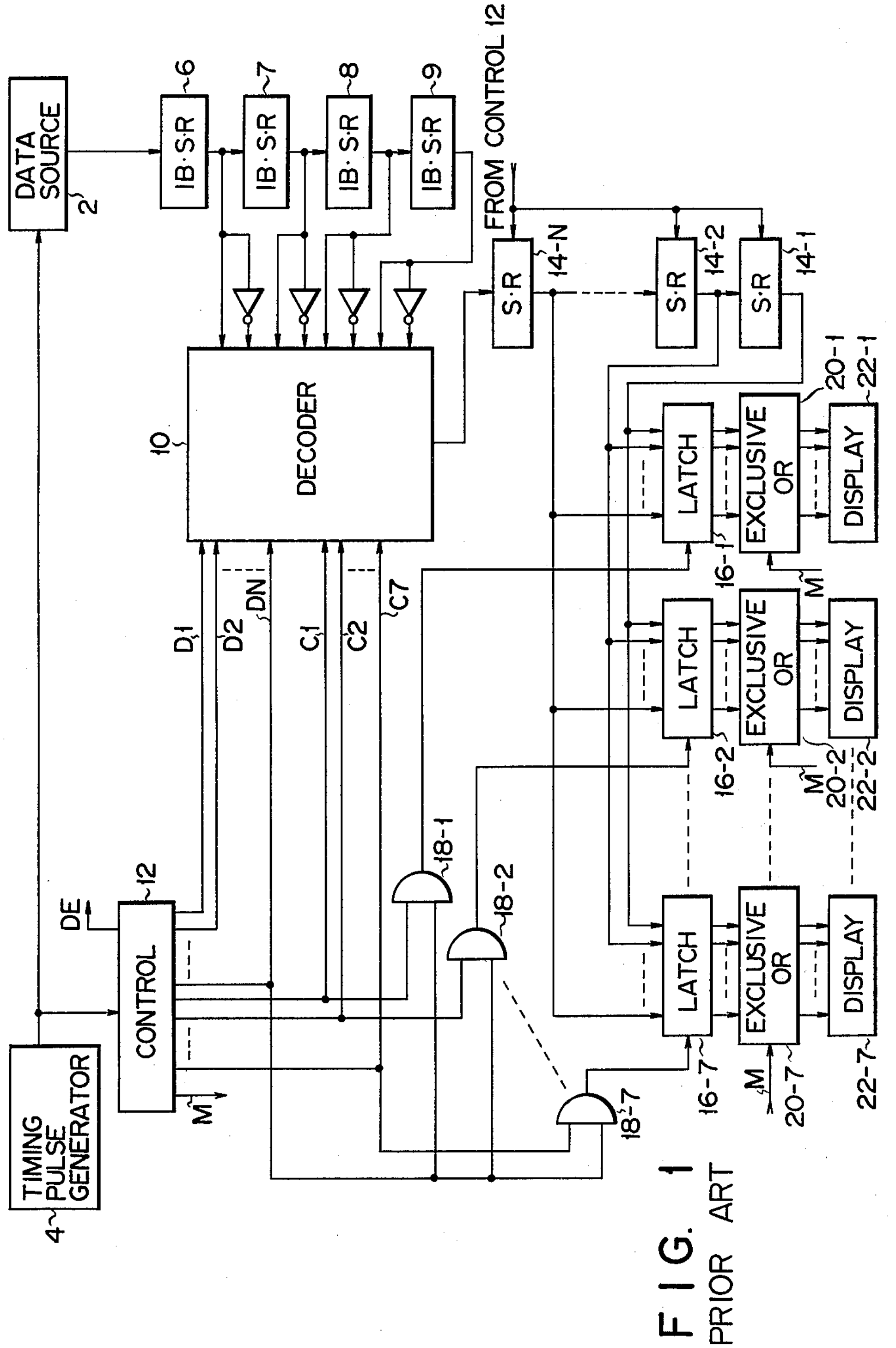
FIG. 1 PRIOR ART
FIG. 1 is a block diagram of a prior art data display circuit.
Figure 2A:
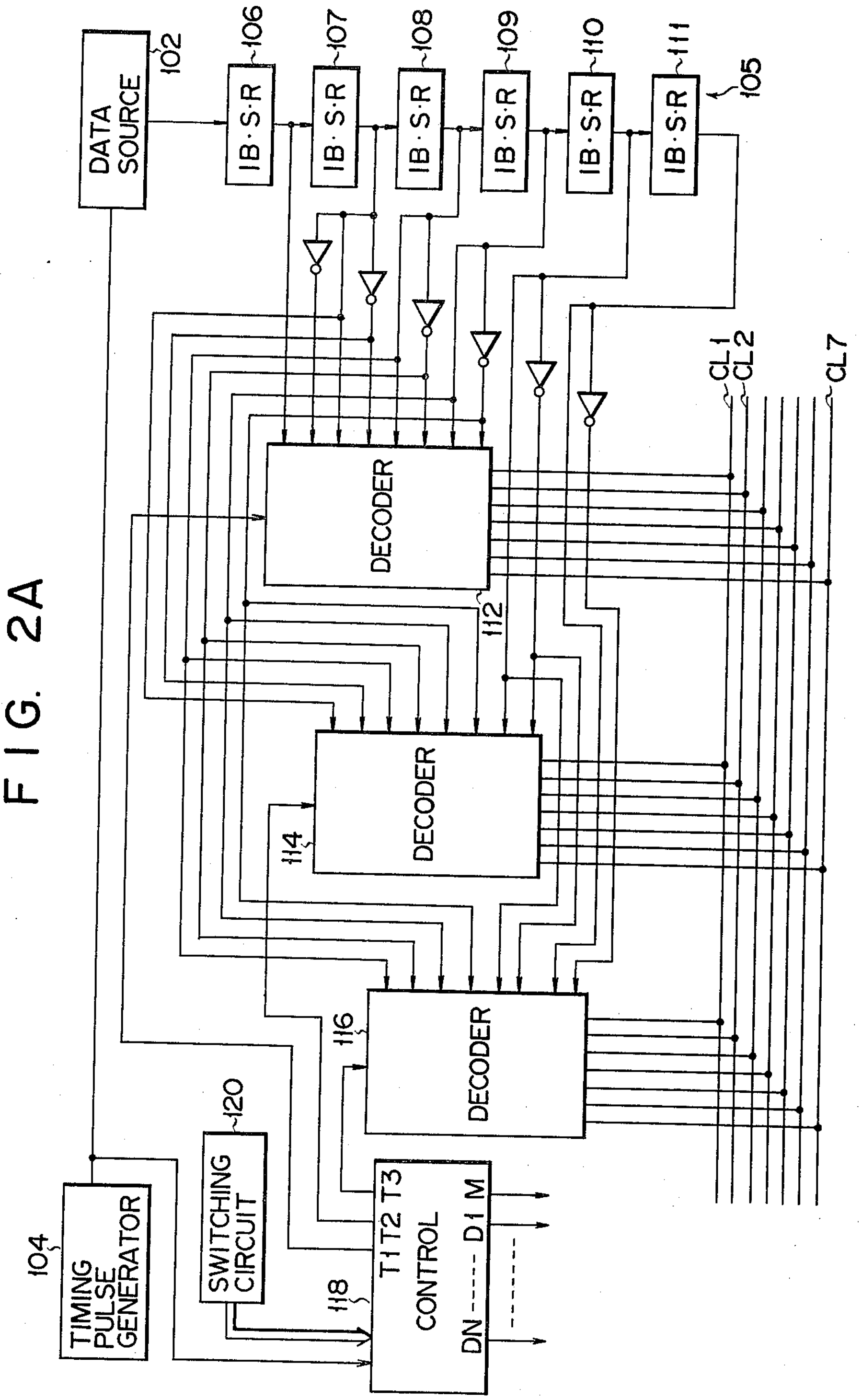
FIGS. 2A and 2B are block diagrams of a data display circuit according to an embodiment of this invention.
Figure 2B:
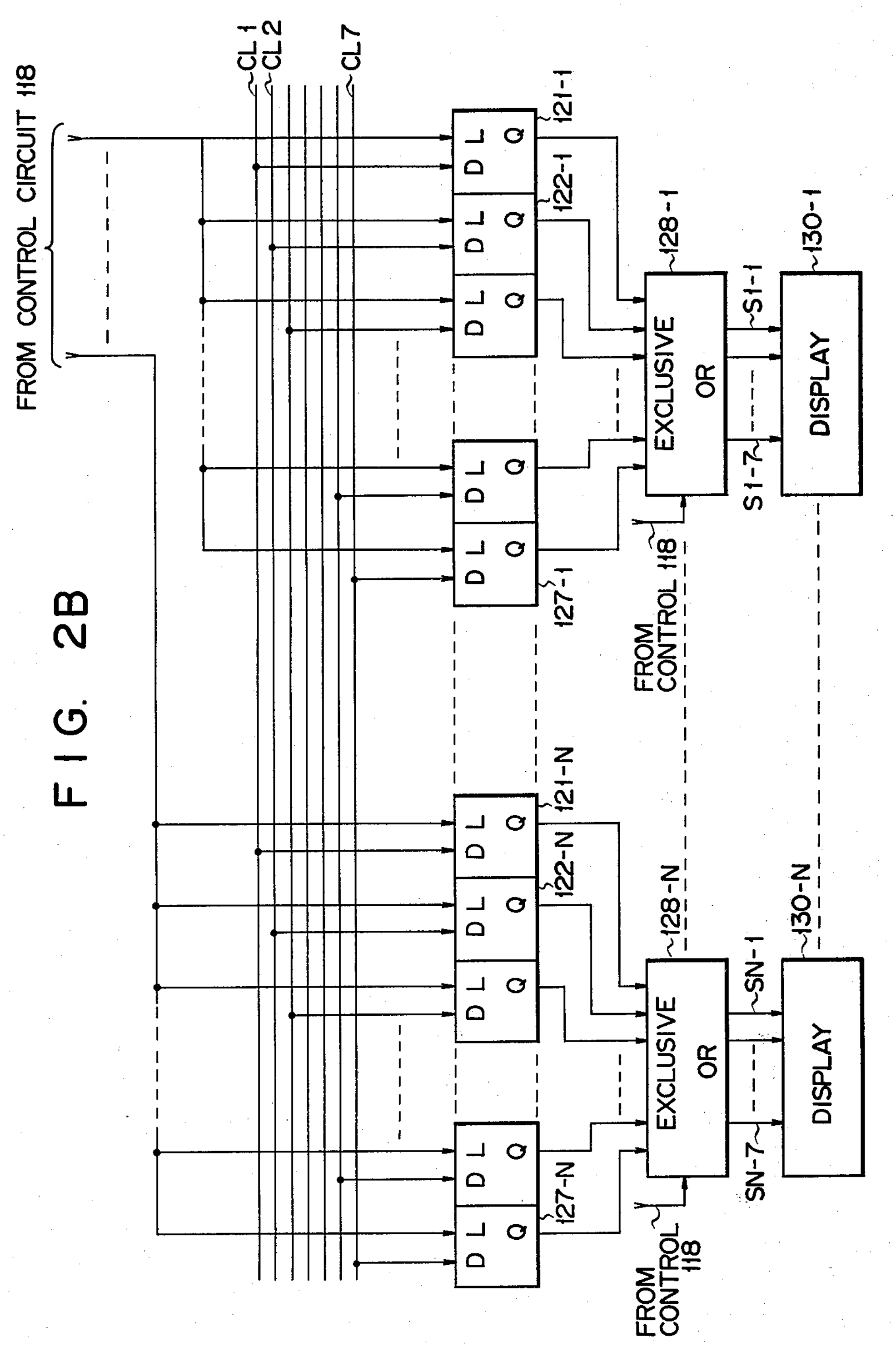

The data display circuit as shown in FIGS. 2A and 2B is provided with a data source 102 composed of a timer circuit or the like which is driven by a timing pulse generator 104 to produce serial time data. The serial time data from the data source 102 are converted into parallel time data by a shift register circuit including six cascade-connected 1-bit shift registers 106 to 111. The respective output terminals of the shift registers 106 to 109 are coupled to a decoder 112, while those of the shift registers 107 to 110 and 108 to 111 are connected to decoders 114 and 116, respectively. Namely, the parallel output data from the shift register circuit are successively supplied to the decoders 112, 114 and 116 with delays of 1 bit. These decoders 112, 114 and 116 may, for example, be used respectively as decoders to process data representing "hour", "minute" and "second", stop-watch data, and "day-of-the-week" data, out of data transmitted from the data source 102. The respective output terminals of the decoders 112, 114 and 116 are coupled to common lines CL1 to CL7. Also, the decoders 112, 114 and 116 are coupled, respectively, with output terminals T1, T2 and T3 of a control circuit 118 which receives timing pulses from the timing pulse generator 104 and produces three control signals from the output terminals T1, T2 and T3. In response to output signals from a switching circuit 120, the control circuit 118 delivers through output terminals D1 to DN digit pulses in synchronism with one of the control signals generated from the output terminals T1, T2 and T3. The switching circuit 120 includes a plurality of switches (not shown), delivering output signals corresponding to the operating positions of these switches.

As shown in FIG. 2B, the common lines CL1, CL2 and CL3 are coupled to the D-input terminals of latches 121-1 to 121-N, 122-1 to 122-N, and 127-1 to 127-N, respectively. Other common lines (not shown) are also coupled to the D-input terminals of their corresponding N latches. The output terminals D1, . . . , DN of the control circuit 118 coupled in common to the load terminals of the latches 121-1 to 127-1, . . . , 121-N to 127-N. Further, the Q-output terminals of the latches 121-1 to 127-1, . . . , 121-N to 127-N are coupled to exclusive OR circuits 128-1, . . . , 128-N. These exclusive OR circuits 128-1 to 128-N function as a driving circuit for modulating in response to a modulation signal M from the control circuit 118 output signals from the latches 121-1 to 127-N into driving signals suitable for driving liquid-crystal display devices 130-1 to 130-N. That is, segment driving signals S-1 to S-7 are supplied from the exclusive OR circuits 128 to the display device 130.

Now there will be described the operation of the data display circuit as shown in FIGS. 2A and 2B. First, serial time data are generated from the data source 102 in response to the output pulse from the timing pulse generator 104. These serial time data are converted into parallel time data by the shift register circuit 105 including the shift registers 106 to 111. The output data of the shift registers 106 to 109 are supplied to the decoder 112, which delivers segment data outputs to the common lines CL1 to CL7 in response to the control pulse generated from the output terminal T1 of the control circuit 118. Further, the output data of the shift registers 107 to 110 are supplied to the decoder 114, which delivers segment data outputs to the common lines CL1 to CL7 in response to the control pulse generated from the output terminal T2 of the control circuit 118. Here it is to be noted that the control pulse from the output terminal T2 of the control circuit 118 are generated with a delay of 1 bit behind the control pulse from the output terminal T1, so that the input data to be decoded by the decoder 114 are substantially the same as those which are decoded by the decoder 112. Moreover, segment data outputs corresponding to the output data of the shift registers 108 to 111 are delivered to the common lines CL1 to CL7 in response to the control pulse generated from the output terminal T3 of the control circuit 118 with a delay of 1 bit behind the control pulse from the output terminal T2. Naturally, the input data to be decoded by the decoder 116 is substantially the same as those which are decoded by the decoders 112 and 114. Since the decoders 112, 114 and 116 are so constructed as to process 4-bit data, a subsequent control pulse is to be generated from the output terminal T1 with a delay of 2 bits behind the control pulse from the output terminal T3.

The segment data thus delivered to the common lines CL1 to CL7 are supplied to the latches 121-1 to 127-N in response to the digit designating pulses produced from the output terminals D1 to DN of the control circuit 118. Let it be supposed that the switching circuit 120 is so set as to cause digit pulses in synchronism with the control pulse from the output terminal T1 of the control circuit 118 to be generated from the output terminals D1 to DN, for example. In this case, the segment data delivered from the decoder 112 to the common lines CL1 to CL7 in response to the control pulse from the output terminal T1 are introduced into the latch circuits 121-1 to 127-1 in response to the digit pulse from the output terminal D1. Likewise, segment data for the other digits are introduced into their corresponding latches in response to the digit pulses from the control circuit 118. When the segment data delivered to the common lines are introduced into the latch circuits 121-N to 127-N in response to the control pulse from the output terminal DN, all the data corresponding to the N-digit data transmitted from the data source 102 are considered to have been stored in the latches 121-1 to 127-N.

Thus, the segment data held in the latches 121-1 to 127-1, . . . , 121-N to 127-N are supplied to the exclusive OR circuits 128-1, . . . , 128-N. For example, the first-digit segment data stored in the latches 121-1 to 127-1 are modulated into segment energizing signals S1-1 to S1-7 by the exclusive OR circuit 128-1, supplied to a display device 130-1, and energizes the selected segments of the display device 130-1. Likewise, the other exclusive OR circuits convert their respective input segment data into segment energizing signals and supply them to their corresponding display devices, energizing the selected segments for the corresponding digits.

By suitably setting the switching circuit to produce from the output terminals D1 to DN of the control circuit 118 digit pulses in synchronism with the control pulse from the output terminal T2 or T3, the parallel data from the shift register circuit 105 may be decoded by means of the decoder 114 or 116, and the selected segments of the display devices 130-1 to 130-N may be energized in response to the decoded segment data.

Although an illustrative embodiment of this invention has been described in detail herein with reference to the accompanying drawings, it is to be understood that the invention is not limited to that precise embodiment. For example, the liquid-crystal display device as shown in FIG. 2B may be replaced by any other suitable type of display device.

What we claim is:

1. A data display circuit comprising a decoding means including a plurality of decoders which receive parallel data with predetermined delay time and decode the individual input parallel data, a plurality of common lines connecting in common the corresponding output terminals of said plurality of decoders, latch means including a plurality of latches with input terminals severally coupled to said common lines, control means for supplying said plurality of decoders with respective control signals with said predetermined delay time and transferring the output data from said individual decoders to said latch means through said common lines, and display means for displaying the stored contents of said latch means.

2. A data display circuit according to claim 1, wherein said control means supplies said plurality of latches with timing pulses produced at different times in synchronism with selected one of said control signals, thereby energizing said latches.

3. A data display circuit according to claim 1 or 2 further comprising a shift register circuit including a plurality of cascade-connected shift registers for converting serial data into parallel data and supplying parallel output data to said decoding means.

4. A data display circuit according to claim 3, wherein said shift register circuit includes (N+1) shift registers, and said decoding means including a first decoder having input terminals coupled with the output terminals of first- to Nth-stage shift registers of said shift register circuit and output terminals coupled severally to said common lines, and a second decoder having input terminals coupled with the output terminals of second- to (N+1) th-stage shift registers of said shift register circuit and output terminals coupled severally to said common lines.

5. A data display circuit according to claim 4, wherein said latch means has a plurality of groups each including a plurality of latches each of which has an input terminal connected to a different one of said common lines, and said control means produces timing pulses at different times in synchronism with selected one of said control signals to energize said plurality of latches in groups.

6. A data display circuit according to claim 3, wherein said latch means has a plurality of groups each including a plurality of latches each of which has an input terminal connected to a different one of said common lines, and said control means produces timing pulses at different times in synchronism with selected one of said control signals to energize said plurality of latches in groups.

7. A data display circuit according to claim 3, wherein said decoding means includes a first decoder having input terminals coupled with the output terminals of a first group of cascade-connected shift registers of said shift register circuit and output terminals coupled severally to said common lines, and a second decoder having input terminals coupled with the output terminals of a different group of cascade-connected shift registers of said shift register circuit and output terminals coupled severally to said common lines.

8. A data display circuit according to claim 7, wherein said latch means includes a plurality of groups each including a plurality of latches each of which has an input terminal connected to a different one of said common lines, and said control means produces timing pulses at different times in synchronism with selected one of said control signals to energize said plurality of latches in groups.

* * * * *